(12) United States Patent
Gillis et al.

(10) Patent No.: US 6,459,655 B1
(45) Date of Patent: Oct. 1, 2002

(54) APPARATUS AND METHOD USING CONTROLLED EMISSION FOR SENSING AN OCCUPANT LOCATED BEYOND A PREDETERMINED DISTANCE

(75) Inventors: Edward J. Gillis, South Lyon; Stephen R. W. Cooper, Fowlerville; Raymond J. David, Dearborn Heights, all of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/679,172

(22) Filed: Oct. 4, 2000

(51) Int. Cl.⁷ .................................................. G01S 15/00
(52) U.S. Cl. ............................. 367/96; 367/99; 701/45
(58) Field of Search ........................ 367/99, 124, 127, 367/96; 701/45; 280/735

(56) References Cited

U.S. PATENT DOCUMENTS

| | | |
|---|---|---|
| 3,588,798 A | 6/1971 | Papineau |
| 4,308,599 A | 12/1981 | Thiele |
| 4,551,825 A | 11/1985 | Biber |
| 4,807,202 A | 2/1989 | Cherri et al. |
| 4,905,208 A | 2/1990 | Dick |
| 5,330,226 A | 7/1994 | Gentry et al. |
| 5,418,758 A | 5/1995 | Webster |
| 5,785,347 A | 7/1998 | Adolph et al. |
| 5,906,393 A | 5/1999 | Mazur et al. |
| 6,014,602 A | * 1/2000 | Kithil et al. ................... 701/45 |
| 6,272,411 B1 | * 7/2001 | Corrado et al. ................ 701/45 |

* cited by examiner

Primary Examiner—Daniel T. Pihulic
(74) Attorney, Agent, or Firm—Tarolli, Sundheim, Covell, Tummino & Szabo L.L.P.

(57) ABSTRACT

An apparatus (20) determines a target (e.g., a vehicle occupant 22) beyond a predetermined distance. In an exemplary embodiment, the apparatus (20) determines a distant target for use in control of air bag deployment. The apparatus (20) includes a sensor (44) for emitting and receiving first (52, 56) and second (54, 58) signals in an interspersed predetermined emission sequence toward the target. A controller (60) successively determines a time interval between the emission of a current signal and the reception of an echo. The controller (60) successively compares at least two time intervals to determine whether a sufficient difference exists to indicate that the target is beyond the predetermined distance and outputs a signal to the air bag actuation system (62). The controller (60) also performs a distance calculation to the target using at least one of the time-of-flight periods of the first and second signals, where the first time-of-flight period occurs between emission and echo reception of the first signal and where the second time-of-flight period occurs between emission and echo reception of the second signal, and outputs a signal to the air bag actuation system (62).

25 Claims, 3 Drawing Sheets

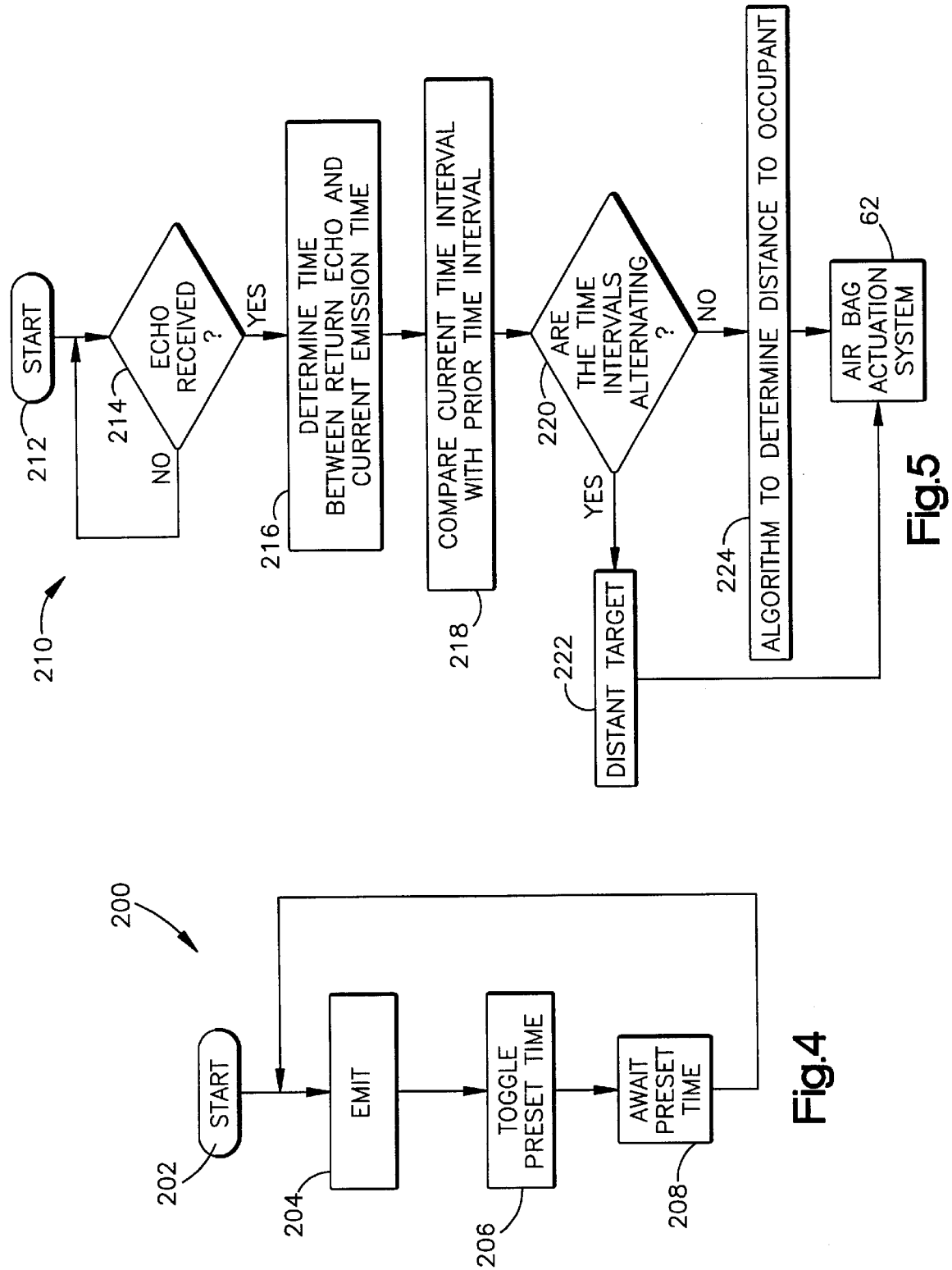

US 6,459,655 B1

APPARATUS AND METHOD USING CONTROLLED EMISSION FOR SENSING AN OCCUPANT LOCATED BEYOND A PREDETERMINED DISTANCE

FIELD OF THE INVENTION

The present invention relates to echo-ranging distance determination systems. More particularly, it relates to a system that determines whether a target, such as a vehicle occupant, is located beyond a predetermined distance.

BACKGROUND OF THE INVENTION

Within a vehicle occupant protection system, it is known to control the inflation profile of an air bag based upon a distance between an air bag assembly and a vehicle occupant. For example, it is known to adjust the amount of inflation fluid provided to an air bag based upon the distance between the occupant and the air bag assembly. The distance between the occupant and the air bag assembly can change during a pre-crash braking condition. Specifically, during a pre-crash braking condition, the vehicle decelerates and the inertia of the occupant causes the occupant to move forward relative to the seat toward an instrument panel that contains the air bag assembly.

A known vehicle occupant protection system includes an echo-ranging system to determine the distance between the air bag assembly and the occupant. The echo-ranging system operates by emitting a short burst of a carrier signal that travels directly between an emitter and the occupant. The emitted signal bounces on the occupant and the bounced signal returns to a receiver as a return echo of the emitted signal. The echo-ranging system includes a time-of-flight distance determination system that determines the time elapsed between the emission of the signal from the emitter and the return of the echo at the receiver, and from this time differential determines the distance between the occupant and the air bag assembly.

Ideally, the time period between signal emission and echo reception is long enough to allow the signal to travel to the occupant and return before the emission of a subsequent signal. However, if the occupant is located sufficiently far away, then the echo returns after a subsequent signal is emitted. Such a return echo can be termed a late echo. Also, although systems are usually designed to bounce the signal on the vehicle occupant, it is possible that the signal may bounce on other surfaces within the vehicle. This situation occurs if the occupant turns or leans and the signal bounces on the occupant's seat, on a back seat of the vehicle, or on other surfaces within the vehicle. Such other surfaces may also be located sufficiently far to cause return of a late echo.

The result is that the time-of-flight distance determination system calculates the time period between the subsequent emitted signal and the receipt of the return echo (i.e., late echo) associated with the prior emitted signal and thereby miscalculates the distance to be closer than actuality.

One particular type of echo-ranging system includes a head unit that incorporates three ultrasonic transmitters and three ultrasonic receivers for emitting and receiving ultrasonic signals. The system is capable of differentiating between ultrasonic signals generated from transmitters physically separated from each other so that a receiver can identify the source of each ultrasonic signal that is received.

Another type of echo-ranging system is a system that locates the occupant by emitting and receiving ultrasonic signals using two or more ultrasonic transducers. These transducers are located in various locations in the vehicle passenger compartment. As a result, by implementing multiple transducers and by placing each transducer in a different location, each transducer receives the return signal associated with the signal that each individual transducer emitted.

SUMMARY OF THE INVENTION

The present invention provides a method and apparatus for determining whether a target is located beyond a predetermined distance. In accordance with one aspect, the present invention provides an apparatus that includes means for emitting first and second signals in an interspersed predetermined emission sequence toward the target. The apparatus includes means for receiving returns of the first and second signals bounced on the target. The apparatus includes means for processing to determine if the target is beyond a predetermined distance using at least one of the returns of the first and second signals and for providing a signal indicative of the determination.

In accordance with another aspect, the present invention provides an apparatus for determining whether a target is located beyond a predetermined distance that includes means for emitting first and second signals in an interspersed predetermined emission sequence toward the target and means for receiving return echoes of the first and second signals.

The apparatus includes means for successively determining a time interval between the emission of a current signal and the reception of an echo. The apparatus further includes means for successively comparing at least two time intervals to determine whether a sufficient difference exists to indicate that the target is beyond the predetermined distance and for outputting a signal indicative thereof.

In accordance with another aspect, the present invention provides an apparatus for determining whether a target is located beyond a predetermined distance that includes means for emitting first and second signals in an interspersed predetermined emission sequence toward the target and means for receiving returns of the first and second signals bounced on the target.

The apparatus further includes means for controlling said means for emitting the first and second signals to overlap a first time-of-flight period of the first signal, wherein the first time-of-flight period occurs between emission and echo reception of the first signal, and a second time-of-flight period of the second signal, wherein said second time-of-flight period occurs between emission and echo reception of the second signal. The apparatus includes means for successively determining a time interval between the emission of a current signal and the reception of an echo. The apparatus further includes means for performing a distance calculation to the target using at least one of the time-of-flight periods of the first and second signals and for outputting a signal indicative thereof.

In accordance with still another aspect, the present invention provides a method that includes the steps of emitting first and second signals in an interspersed predetermined emission sequence toward the target and receiving returns of the first and second signals bounced on the target. The method also includes the step of processing to determine if the target is beyond a predetermined distance using at least one of the returns of the first and second signals, and providing a signal indicative of the determination.

In accordance with another aspect, the present invention provides a method for determining whether a target is located beyond a predetermined distance that includes the steps of emitting first and second signals toward the target in a staggered emission sequence and receiving return echoes of the first and second signals.

The method further includes the steps of successively determining a time interval between the emission of a current signal and the reception of an echo and successively comparing at least two time intervals to determine whether a sufficient difference exists to indicate that the target-is beyond the predetermined distance and outputting a signal indicative thereof.

In accordance with another aspect, the present invention provides a method for determining whether a target is located beyond a predetermined distance that includes the steps of emitting first and second signals in a staggered emission sequence toward the target and receiving returns of the first and second signals bounced on the target. The method includes the step of controlling said step of emitting the first and second signals to overlap a first time-of-flight period of the first signal, wherein the first time-of-flight period occurs between emission and echo reception of the first signal, and a second time-of-flight period of the second signal, wherein said second time-of-flight period occurs between emission and echo reception of the second signal.

The method further includes the steps of successively determining a time interval between the emission of a current signal and the reception of an echo, successively comparing at least two time intervals to determine whether a sufficient difference exists to indicate that the target is beyond the predetermined distance and outputting a signal indicative thereof. The method further includes the step of performing a distance calculation to the target using at least one of the time-of-flight periods of the first and second signals and outputting a signal indicative thereof.

BRIEF DESCRIPTION OF THE DRAWINGS

Further features and advantages of the present invention will become apparent to those skilled in the art from reading the following detailed description with reference to the accompanying drawings, in which:

FIG. 4 is a flowchart diagram showing a process for emitting signals for the system of FIG. 1; and FIG. 5 is a flowchart diagram showing a process for receiving return echoes and for processing the return signals for the system of FIG. 1.

DETAILED DESCRIPTION OF THE PREFERRED EMBODIMENT

Figure 1:
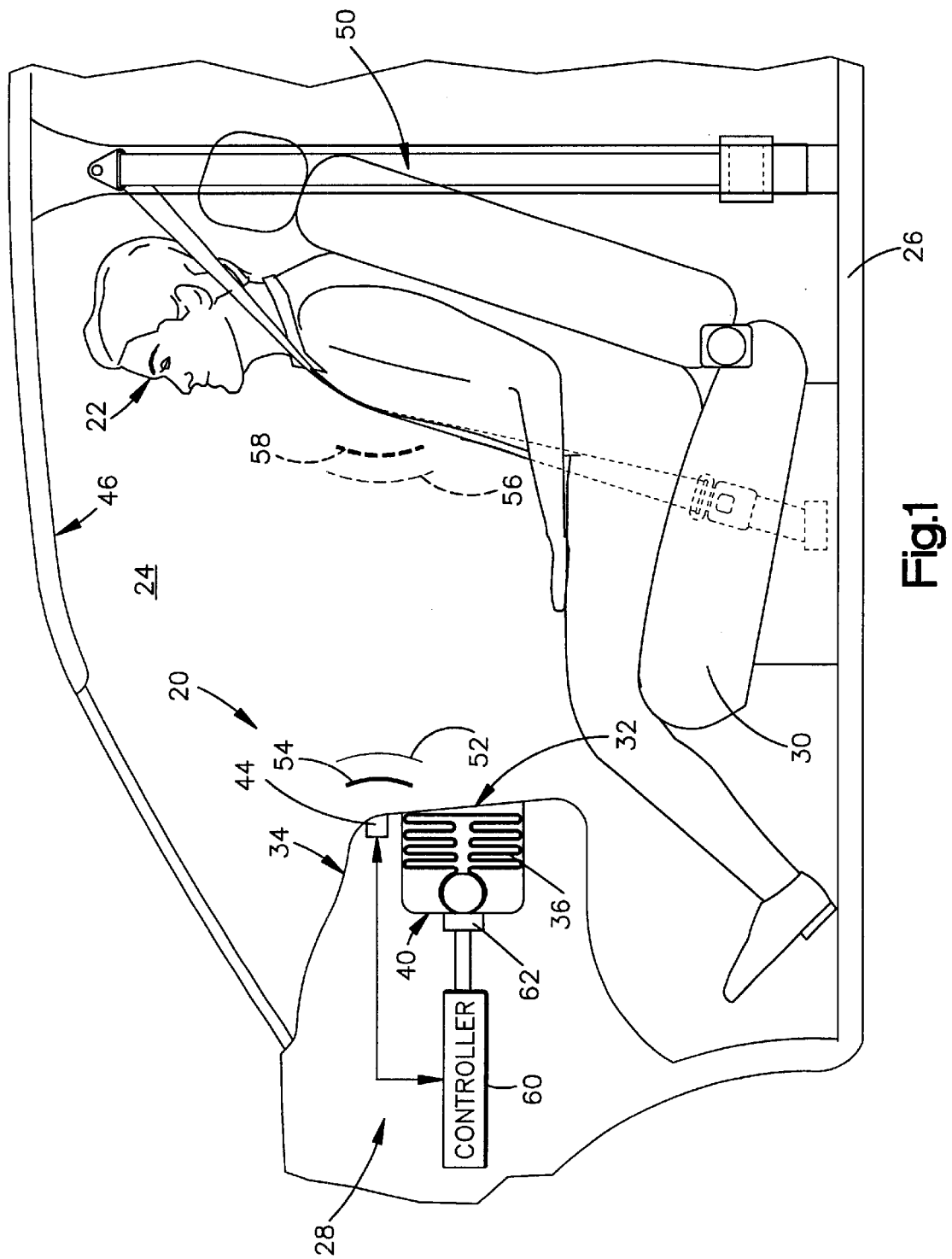
FIG. 1 is a schematic diagram of an occupant position tracking apparatus, in accordance with the present invention, within an occupant protection system for a vehicle.

FIG. 1 shows an example of an occupant protection system 20 for protecting an occupant 22 located within a vehicle driver compartment 24 of an associated vehicle 26. The occupant protection system 20 includes a distance determining apparatus 28 in accordance with the present invention. The apparatus 28 repeatedly determines a distant occupant 22 (e.g., the target) and thus the apparatus 28 tracks the position of the occupant 22 with regard to the vehicle 26.

The occupant 22 is seated on a vehicle seat 30 within the vehicle 26. Although the embodiments shown herein concern the driver's front seat 30 of a passenger car, it is to be understood that this invention is applicable to any seat in any vehicle and other applications as well.

In the illustrated example, the occupant protection system 20 includes an air bag assembly 32 mounted within a dashboard or instrument panel 34 of the vehicle 26. The air bag assembly 32 includes an air bag 36 folded and stored within an air bag housing 40 compartment. The air bag 36 is inflatable within the vehicle passenger compartment 24 of the vehicle 26. Although the embodiment disclosed herein is associated with an air bag assembly 32, the occupant protection system 20 can be utilized with other types of occupant protection devices, such as a seat belt pretensioner, a knee bolster, or a side curtain, or may even be used for an application that does not include an occupant protection device.

The occupant protection system 20, and preferably the air bag assembly 32 per se, has an adjustable aspect such that deployment of the air bag 36 is adjustable. As one example, complete suppression of actuation of the air bag 36 is an adjustable aspect. Also, inflation timing, inflation pressure, and position of the inflated air bag 36 are adjustable. In an exemplary embodiment, control of the adjustable aspect is based upon the sensed position of the occupant 22. Some examples of adjustment of an air bag controlled as a function of sensed occupant position are disclosed in U.S. Pat. Nos. 5,330,226, 5,670,853, and 5,904,368.

Turning to the distance determining apparatus 28, a sensor 44 of the apparatus is mounted next to the air bag assembly 32, on the instrument panel 34. It is to be appreciated that the sensor 44 may be mounted at some other location within the vehicle passenger compartment 24, such as on a headliner 46 or on a seatback 50. Preferably, the sensor 44 is an ultrasound transducer that emits and receives signals. Each signal is comprised of a short burst of a carrier frequency.

The emitted signals are identified as first and second signals 52, 54 that are emitted in a staggered, alternating emission sequence. The first and second signals 52, 54 are repeatedly emitted to each have a respective time interval for the emissions. The emissions of the first and second signals 52, 54 are such that the second signals 54 are interspersed among the first signals 52.

In the exemplary embodiment, the emission of the first and second signals 52, 54 are alternated, with the emission of each second signal 54 occurring at a preset time after emission of a respective first signal 52. The timing of emission is such that the elapsed time from a first signal 52 emission to a subsequent second signal 54 emission is different than the elapsed time from a second signal 54 emission to a subsequent first signal 52 emission.

Although in the exemplary embodiment the emission between the first and second signals are in an alternating emission sequence, the emission can be arranged in different interspersed sequences. In addition, although only two emission times are implemented in the exemplary embodiment, a person of ordinary skill in the art will appreciate that an emission staggering arrangement involving more than two emission times could be implemented.

Signal emission at a rate and the reception of an echo therefrom is referred to as a sensor rate. Preferably, the sensor rate associated with the first and second signals 52, 54 is on the order of milliseconds. In an exemplary embodiment, the sensor rate is one first signal 52 emission per 8 milliseconds. The sensor rate is one second signal 54 emission per 8 milliseconds.

For purposes of clarity, the first signal 52 is represented in FIG. 1 using a thin solid line and the return echo 56 associated with the first signal is represented using a thin dashed line. Similarly, the second signal 54 is represented using a thick solid line and the return echo 58 associated with the second emitted signal is represented using a thick dashed line. The first and second signals 52, 54 are depicted in an alternating emission to show that each first signal 52 is followed by a second signal 54 that occurs at a preset time.

A person of ordinary skill in the art will appreciate that more than one sensor may be used as an alternative to the one shown sensor 44. Also, a person of ordinary skill in the art will appreciate that a different type of sensor may be used, such as an infrared sensor.

Turning back to the exemplary embodiment, the distance determining apparatus 28 includes a controller 60, such as a microcomputer, that is operatively connected to the sensor 44. The controller 60 controls the sensor 44 to emit signals 52, 54 in the staggered, alternating emission sequence. Also, the controller 60 determines the target (i.e., the occupant 22) to be beyond a predetermined distance and the distance between the air bag assembly 32 and the occupant 22 using an algorithm procedure. A person of ordinary skill in the art will appreciate that the microcomputer can be of any digital or analog type such as an application specific integrated circuit (ASIC), a microprocessor, a micro-controller, or a combination of suitable electronic components.

After the signals 52, 54 are emitted, associated return echoes 56, 58 are bounced back to the sensor 44. In order to make distance determinations to the target (e.g., the occupant 22) within a predetermined distance, the controller 60 monitors the time between the emission of each signal 52, 54 and the reception of each associated return echo 56, 58. From this time difference, the controller 60 determines the distance between the air bag assembly 32 and the target (e.g., the occupant 22) using an algorithm procedure.

Specifically, the return time of the echo 56, 58 divided by twice the propagation speed of the emitted signal gives the distance to the occupant 22. Distance calculation between the occupant 22 and the air bag assembly 32 is based upon a known distance between the sensor 44 and the air bag assembly 32 and the use of simple geometric relation between the sensor 44 and the air bag assembly 32. The controller 60 then outputs a signal indicative of the distance between the occupant 22 and the air bag assembly 32 to an air bag actuation system 62, which controls the air bag inflation.

It is to be appreciated that an evaluation of the amplitude and/or shape of a return echo (e.g., 56) can provide additional information. For instance, depending on the processing capabilities and techniques of distance determining apparatus 28, information concerning the size, shape, orientation, and composition of the target (e.g., the occupant 22) can be extracted from the amplitude and shape of the return echo.

Furthermore, in some situations, the apparatus 28 may sense certain movements of the occupant 22, such as waving a hand, which should not be interpreted to be indicative that the occupant 22 is close to the air bag assembly 32. Such occupant movements are referred to herein as spurious movements.

The present invention is useful to avoid controlling the air bag 36 responsive to such spurious movements. In normal operating conditions, the apparatus 28 does not need to work at a high emission rate to update the occupant 22 position. In one embodiment, the system's 20 emission rate may be varied. In normal operating conditions, the apparatus 28 could lower the emission rate and, in pre-crash conditions, the apparatus 28 could increase the emission rate. As a result, in situations where the apparatus 28 senses a return echo that bounces on other surfaces within the vehicle 26, sensing at lower rates tends to provide a filtering effect such that spurious movements or signals bouncing from surfaces other than the occupant 22, are not interpreted to be indicative of the distance between the occupant 22 and the sensor 44. In view of the fact that the present invention avoids problems that may occur from late echoes, the variation of the emission rate is possible.

Figure 2:
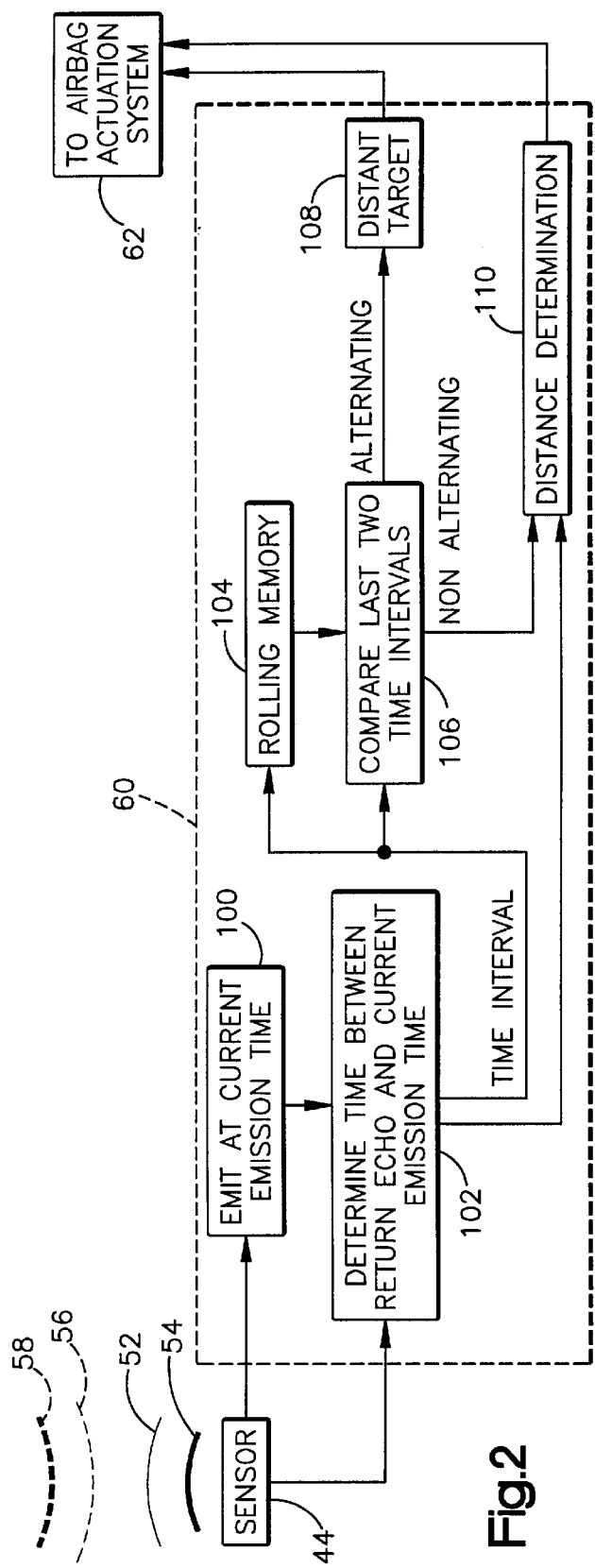
FIG. 2 is a schematic block diagram of the apparatus of FIG. 1.

Turning to the operation for distance determination, referring to FIG. 2, a staggered emitter 100 controls the sensor 44 to emit signals repeatedly in an alternating sequence. For illustrative purposes, the staggered emitter 100 emits a signal and starts an internal clock. Because the target is at a distant location, the return echo of the emitted signal returns after a subsequent signal is emitted. As a result, with respect to the very first signal emission, the staggered emitter 100 disregards the first emission and resets the clock when it emits a subsequent signal. Upon receipt of the echo, the sensor 44 sends an electrical signal to the staggered emitter 100 indicative of the time the echo returns to the sensor 44, which in turn, stops the stagger emitter's 100 internal clock.

The staggered emitter 100 passes two signals to a time interval determination 102; the first signal indicative of the time of emission the subsequent signal and the second signal indicative of the time of the echo reception. The time interval determination 102 then determines the time interval between the reception of the echo and the emission of the subsequent signal. From this time differential, the time interval determination 102 outputs a signal indicative of a time interval. This time interval is then stored in a rolling memory 104 so it can later be compared to a subsequent time interval.

A compare block 106 receives from the time interval determination 102 a signal indicative of the most current time interval. The compare block 106 also receives a stored signal from the rolling memory 104 indicative of a prior time interval. The compare block 106 compares the prior time interval and the current time interval and determines whether the duration of the prior time interval is different from the duration of the most current time interval; that is, if the time intervals are alternating. It should be noted that, in order for the compare block 106 to adequately determine if the time intervals are alternating, the compare block 106 must compare at least two time intervals.

If the compare block 106 determines that the time intervals are alternating, then it sends a signal to a distant target determination 108. The distant target determination 108 concludes that the target (i.e., the occupant 22) is beyond a predetermined distance and outputs a signal indicative thereof to the air bag actuation system 62. Although in the exemplary embodiment the distance between the air bag assembly 32 and the target (e.g., the occupant 22) is not precisely determined if the distance is greater than the predetermined amount, in an alternative embodiment the controller 60 could make such distance determination.

However, if the compare block 106 determines that the time intervals are not alternating, then it enables a distance determination block 110. The distance determination block 110 receives a signal from the compare block 106 indicative that the occupant 22 is not beyond a predetermined distance. The distance determination block 110 then proceeds to calculate the distance to the occupant 22. In order to make distance measurements, the distance determination block 110 receives a signal from the time interval determination 102 indicative of the time between the emission of the signal and reception of the associated return echo. From this time differential, the distance determination block 110 calculates a distance between the sensor 44 and the target (e.g., the occupant 22).

Specifically, the return time of the echo divided by twice the propagation speed of the emitted signal gives the distance to the occupant 22. Distance calculation between the occupant 22 and the air bag assembly 32 is based upon a known distance between the sensor 44 and the air bag assembly 32 and the use of simple geometric relation between the sensor 44 and the air bag assembly 32. The distance determination block 110 then outputs a signal indicative of the distance between the occupant 22 and the air bag assembly 32 to an air bag actuation system 62, which controls the air bag inflation.

Figure 3:
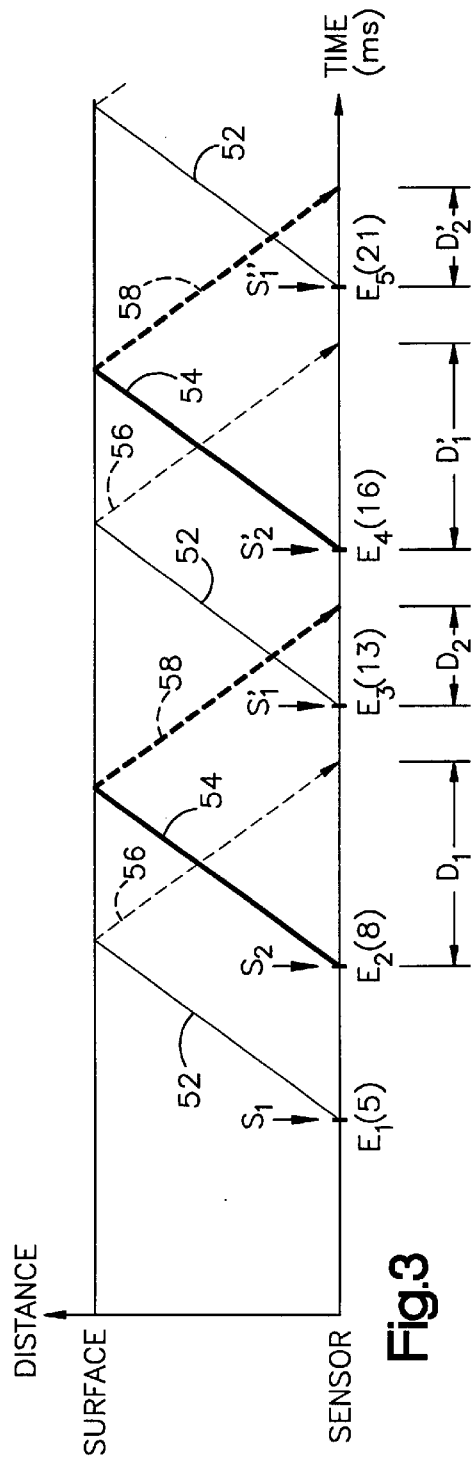
FIG. 3 is an example plot of signal emission in a staggered emission sequence and their associated return echoes for the apparatus of FIG. 2.

As an example of operation, referring to FIG. 3, the first and second signals 52, 54 are repeatedly emitted every 8 ms. Also, the emission occurrence of each second signal 54 is alternating with the emission occurrence of each first signal 52.

At room temperature, it takes about one millisecond for each 13.6 inches of travel to the target (i.e., the occupant 22). Thus, the maximum distance a signal can travel in 5 ms is 68 inches before a subsequent signal is emitted and the maximum distance a signal can travel in 3 ms is 40.2 inches before a subsequent signal is emitted. The target in this example is located 47.6 inches away from the sensor. As a result, a signal travels out to the target and bounces back to the sensor 44 in 7 ms.

FIG. 3 shows signal emissions in a staggered sequence and return of the associated echoes bouncing off a surface located 47.6 inches away from the sensor 44. The distance from the sensor 44 is represented by the vertical axis and the time of travel (ms) is represented by the horizontal axis. A signal 52, $S_1$, is emitted at $E_1$ (5 ms). In the example, $S_1$ signal 52 bounces off the target and returns 56 to the sensor 7 ms after its emission However, because a second signal 54, $S_2$, is emitted 3 ms after the emission of $S_1$ (i.e., at 8 ms), the $S_2$ signal 54 is emitted prior to the reception of the $S_1$ echo 56. As a result, the $S_1$ echo 56 is late by 4 ms. A late echo is referred hereon as an echo that returns after a subsequent signal is emitted.

The $S_2$ signal 54, emitted at $E_2$, bounces off the target located 47.6 inches away from the sensor 44 and returns 58 to the receiver 7 ms after its emission. However, because a subsequent first signal 52, $S_1'$, is emitted 5 ms after the emission of $S_2$ 54 (i.e., at 13 ms), the $S_1'$ signal 52 is emitted prior to the reception of the $S_2$ echo 58. As a result, the $S_2$ echo 58 is late by 2 ms.

The emission sequence emits the subsequent first signal $S_1'$ 52 at $E_3$ (at 13 ms). The $S_1'$ signal 52 bounces off the target and returns 56 to the receiver 7 ms after its emission. However, because a subsequent second signal $S_2'$ 54 is emitted 3 ms after the emission of $S_1'$ 52 (i.e., at 16 ms), the $S_2'$ signal 54 is. emitted prior to the reception of the $S_1'$ echo 56. As a result, the $S_1'$ echo 56 is late by 4 ms.

As a result, time intervals between the emission of the signal (i.e., 54) and the reception of the late return echo (i.e., 56) are processed by the controller 60. Specifically, D1 corresponds to the time interval between the emission of the $S_2$ signal 54 and the late return of the $S_1$ echo 56. $D_2$ corresponds to the time interval between the emission of the $S_1'$ signal 52 and the late return of the $S_2$ echo 58. $D_1'$ corresponds to the time interval between the emission of the $S_2'$ signal 54 and the late return of the $S_1'$ echo 56. $D_2'$ corresponds to the time interval between the emission of the $S_1''$ signal 52 and the late return of the $S_2'$ echo 58. It can be appreciated in the emission sequence, that $D_1$ and $D_2$ are of different time duration, that is, 4 ms and 2 ms, respectively. As a result, the controller 60 processes the duration of each time interval to alternate from 4 ms to 2 ms and back to 4 ms. Once the controller 60 determines that $D_1$, $D_2$, $D_1'$, and $D_2'$ are alternating, the controller 60 transmits an output signal to the air bag actuation system 62 indicative that the target is located at a distant location.

One embodiment of a process performed by the controller 60, in accordance with the present invention, is shown in FIG. 4. The process 200 is initiated at step 202 and proceeds to step 204. At step 204, the controller 60 actuates the sensor 44 so that a signal is emitted. At step 206, the controller 60 toggles the preset time of emission. At step 208, the controller 60 runs an internal counter to count-up to the preset time of emission. The process 200 then loops back to step 204 and emits a subsequent signal. The timing of emission is such that the elapsed time from a first signal emission to a subsequent second signal emission is different than the elapsed time from a second signal emission to a subsequent first signal emission.

The receiving echo process 210 is shown in FIG. 5. The process 210 is initiated at step 212 and proceeds to step 224. At step 214, the process 210 continuously queries if a return echo is received. If an echo is received, the process proceeds to step 216. At step 216, the process 210 determines the time interval between the return time of the echo and the time of emission of the current signal.

At step 218, the process 210 then compares the current time interval with a time interval previously stored. At step 220, if the process 210 determines that the time intervals are alternating, then the process 210 proceeds to step 222. At step 222, the process 210 determines that the target is located beyond a predetermined distance and outputs a signal indicative thereof to the air bag actuation system 62. On the other hand, if the process 210 determines at step 220 that the time intervals are not alternating, then the process 210 proceeds to step 224.

At step 224, the process 210 performs an algorithmic procedure whereby it determines the time-of-flight between the signal's emission and the reception of the associated return echo thereby determining the distance between the air bag assembly 32 and the occupant 22. The process 210 then outputs a signal indicative of the distance between the air bag assembly 32 and the occupant 22 to the air bag actuation system 62.

Although the foregoing has been applied to a vehicle occupant protection system, various modifications and changes thereto can be made by persons skilled in the art to apply the foregoing to automotive occupant detection, automotive backup warning, cameras for autofocus, and obstacle detection in robots and automatic transports.

Although the foregoing has been a description and illustration of specific embodiments of the invention, various modifications and changes thereto can be made by persons skilled in the art without departing from the scope and spirit of the invention as defined by the following claims.

Having described the invention, the following is claimed:

1. An apparatus for determining whether a target is located beyond a predetermined distance, said apparatus comprising:

means for emitting first and second signals in an interspersed predetermined emission sequence toward the target;

means for receiving returns of the first and second signals bounced on the target; and means for processing to determine if the target is beyond the predetermined distance using at least one of the returns of the first and second signals, and for providing a signal indicative of the determination, wherein said means for processing includes means for successively comparing at least two time intervals to determine whether a sufficient difference exists to indicate that the target is beyond the predetermined distance.

2. The apparatus as set forth in claim 1, wherein said means for emitting includes means for emitting the first and second signals in a staggered, alternating emission sequence toward the target.

3. The apparatus as set forth in claim 1, wherein said means for processing includes means for successively determining a time interval between the emission of a current signal and the reception of an echo.

4. The apparatus as set forth in claim 1, wherein said target is the vehicle occupant.

5. The apparatus as set forth in claim 1, wherein said means for processing includes means for determining a first time-of-flight period of the first signal, wherein said first time-of-flight period occurs between emission and echo reception of the first signal, and a second time-of-flight period of the second signal, wherein said second time-of-flight period occurs between emission and echo reception of the second signal, to determine the distance to the target within the predetermined distance and for outputting a signal indicative thereof.

6. The apparatus as set forth in claim 1, wherein said means for emitting and said means for receiving includes an ultrasonic transducer.

7. A method for determining whether a target is located beyond a predetermined distance, said method comprising the steps of:

emitting first and second signals in an interspersed predetermined emission sequence toward the target;

receiving returns of the first and second signals bounced on the target;

controlling said step of emitting the first and second signals to overlap a first time-of-flight period of the first signal, wherein the first time-of-flight period occurs between emission and echo reception of the first signal, and a second time-of-flight period of the second signal, wherein said second time-of-flight period occurs between emission and echo reception of the second signal;

successively determining a time interval between the emission of a current signal and the reception of an echo;

successively comparing at least two time intervals to determine whether a sufficient difference exists to indicate that the target is beyond the predetermined distance and outputting a signal indicative thereof; and performing a distance calculation to the target using at least one of the time-of-flight periods of the first and second signals and for outputting a signal indicative thereof.

8. An apparatus for determining whether a target is located beyond a predetermined distance, said apparatus comprising:

means for emitting first and second signals in an interspersed predetermined emission sequence toward the target;

means for receiving return echoes of the first and second signals;

means for successively determining a time interval between the emission of a current signal and the reception of an echo; and means for successively comparing at least two time intervals to determine whether a sufficient difference exists to indicate that the target is beyond the predetermined distance and for outputting a signal indicative thereof.

9. The apparatus as set forth in claim 8, wherein said means for emitting includes means for emitting the first and second signals in a staggered, alternating emission sequence toward the target.

10. The apparatus as set forth in claim 8, wherein said means for processing includes means for determining a first time-of-flight period of the first signal, wherein said first time-of-flight period occurs between emission and echo reception of the first signal, and a second time-of-flight period of the second signal, wherein said second time-of-flight period occurs between emission and echo reception of the second signal, to determine the distance to the target within the predetermined distance and for outputting a signal indicative thereof.

11. An apparatus for determining whether a target is located beyond a predetermined distance, said apparatus comprising:

means for emitting first and second signals in an interspersed predetermined emission sequence toward the target;

means for receiving returns of the first and second signals bounced on the target;

means for controlling said means for emitting the first and second signals to overlap a first time-of-flight period of the first signal, wherein the first time-of-flight period occurs between emission and echo reception of the first signal, and a second time-of-flight period of the second signal, wherein said second time-of-flight period occurs between emission and echo reception of the second signal;

means for successively determining a time interval between the emission of a current signal and the reception of an echo;

means for successively comparing at least two time intervals to determine whether a sufficient difference exists to indicate that the target is beyond the predetermined distance and for outputting a signal indicative thereof; and means for performing a distance calculation to the target using at least one of the time-of-flight periods of the first and second signals and for outputting a signal indicative thereof.

12. The apparatus as set forth in claim 11, wherein said means for emitting includes means for emitting the first and second signals in a staggered, alternating emission sequence toward the target.

13. A method for determining whether a target is located beyond a predetermined distance, said method comprising the steps of:

emitting first and second signals in an interspersed predetermined emission sequence toward the target;

receiving returns of the first and second signals bounced on the target; and processing to determine if the target is beyond the predetermined distance using at least one of the returns of the first and second signals, and providing a signal indicative of the determination, wherein said step of processing includes the step of successively comparing at least two time intervals to determine whether a sufficient difference exists to indicate that the target is beyond the predetermined distance.

14. The method as set forth in claim 13, wherein said step of emitting includes the step of emitting the first and second signals in a staggered, alternating emission sequence toward the target.

15. The method as set forth in claim 13, wherein said step of processing includes the step of successively determining a time interval between the emission of a current signal and the reception of an echo.

16. The method as set forth in claim 7, wherein said step of emitting includes the step of emitting the first and second signals in a staggered, alternating emission sequence toward the target.

17. The method as set forth in claim 13, wherein said step of processing includes the steps of determining a first time-of-flight period of the first signal, wherein said first time-of-flight period occurs between emission and echo reception of the first signal, and a second time-of-flight period of the second signal, wherein said second time-of-flight period occurs between emission and echo reception of the second signal, to determine the distance to the target within the predetermined distance and outputting a signal indicative thereof.

18. A method for determining whether a target is located beyond a predetermined distance, said method comprising the steps of:

emitting first and second signals in an interspersed predetermined emission sequence toward the target;

receiving return echoes of the first and second signals;

successively determining a time interval between the emission of a current signal and reception of an echo; and successively comparing at least two time intervals to determine whether a sufficient difference exists to indicate that the target is beyond the predetermined distance and outputting a signal indicative thereof.

19. The method as set forth in claim 18, wherein said step of emitting includes the step of emitting the first and second signals in a staggered, alternating emission sequence toward the target.

20. A vehicle occupant protection system associated with a vehicle seat of a vehicle, the vehicle occupant protection system comprising:

an air bag assembly that is actuatable for helping to protect an occupant of the vehicle seat;

an air bag actuation system for, when enabled, allowing the air bag assembly to be actuated; and an apparatus for determining whether to enable the air bag actuation system, the apparatus including:

a sensor for repeatedly emitting first and second signals and for receiving reflected returns of the first and second signals, the sensor emitting the second signal at a predetermined time following emission of the first signal, and a controller for enabling the air bag actuation system in response to determining the reflected return of the first signal is received subsequent to emission of the second signal.

21. The vehicle occupant protection system of claim 20 wherein the controller compares first and second time intervals and determines subsequent receipt of the first signal in response to a difference existing between the first and second time intervals, the first time interval being between emission of the second signal and receipt of a reflected return following emission of the second signal, the second time interval being between emission of a subsequent first signal and receipt of another reflected return following emission of the subsequent first signal.

22. The vehicle occupant protection system of claim 20 wherein the controller, in response to determining receipt of the reflected return of the first signal prior to emission of the second signal, calculates a distance between the air bag assembly and the occupant of the vehicle seat, enablement of the air bag actuation system being further responsive to the distance calculation.

23. A method of operating a vehicle occupant protection system associated with a vehicle seat of a vehicle, the method comprising the steps of:

providing an air bag assembly that is actuatable for helping to protect an occupant of the vehicle seat;

repeatedly emitting first and second signals, the second signal being emitted at a predetermined time following emission of the first signal;

receiving reflected returns of the first and second signals;

determining whether the reflected return of the first signal is received subsequent to emission of the second signal; and enabling an air bag actuation system in response to determining subsequent receipt of the first signal.

24. The method of claim 23 wherein the step of determining whether the reflected return of the first signal is received subsequent to emission of the second signal includes the steps of:

measuring a first time interval between emission of the second signal and receipt of a reflected return following emission of the second signal;

measuring a second time interval between emission of a subsequent first signal and receipt of another reflected return following emission of the subsequent first signal; comparing the first and second time intervals; and determining subsequent receipt of the first signal in response to a difference existing between the first and second time intervals.

25. The method of claim 23 further including the steps of:

calculating, in response to determining receipt of the reflected return of the first signal prior to emission of the second signal, a distance between the air bag assembly and the occupant of the vehicle seat, said step of enabling being further responsive to the calculated distance.

* * * * *